Patented Dec. 18, 1951

2,579,427

UNITED STATES PATENT OFFICE 2,579,427

ALLYL CARBONATES, POLYMERS, AND COPOLYMERS

Clyde E. Gleim, Akron, Ohio, assignor to Wingfoot Corporation, Akron, Ohio, a corporation of Delaware No Drawing. Application September 9, 1947, Serial No. 773,087

6 Claims. (Cl. 260—77.5)

This invention relates to allyl carbonates and more particularly to the carbonates resulting from the reaction of carbamide oxide and allyl chloroformate.

It has been discovered that the reaction product of carbamide oxide and allyl chloroformate produces an allyl carbonate having the general formula

This allyl carbonate may be identified as N(carballyloxy)ureido allyl carbonate. It also may be named as a derivative of urea by referring to the product as N-allyloxycarboxy-N'-carballyloxy urea.

It has also been discovered that this allyl carbonate may be polymerized to a glass-like infusible and insoluble resinous mass having characteristics which admirably adapt it to the molding of intricate articles. The polyallyl carbonate finds use as a material resistant to wear, abrasion and corrosion. The allyl carbonate may be useful as a drug intermediate as well as a plasticizer.

The allyl carbonate is readily produced by reacting hydroxyl urea (NH$_2$CONHOH) with allyl chloroformate

at −10 to −50° C. More specifically, 0.75 mole of hydroxyl urea having a melting point of 140–140.5° C. was added to 2 moles of pyridine and 200 parts of diethyl ether, to which mixture was then added 1.75 moles of allyl chloroformate at a temperature of −10° C. with stirring of the mixture over a five hour period. The resulting mixture was then warmed up to room temperature with constant stirring and the mixture poured into two parts of ice-cooled dilute hydrochloric acid (about 10 percent). The solid product (98.2 parts) was filtered off and was recrystallized from diluted ethyl alcohol. Recrystallization gave 83 parts of colorless crystalline material having a melting point of 62–63° C. and identified as N(carballyloxy) ureido allyl carbonate.

Infusible and insoluble polymers were prepared by heating the reaction product obtained above at about 65° C. with a peroxide catalyst. The polymers obtained were infusible and of glass-like appearance. Soft, insoluble and somewhat fusible to hard, insoluble and infusible polymers may be obtained by varying the degree of polymerization.

The allyl carbonate may be copolymerized with other polymerizable monomers to form a resinous mass having desirable molding properties. It may also be employed as a cross-linking agent. A particularly desirable copolymer is the one resulting from the copolymerization of the allyl carbonate with vinyl chloride.

A solution of 10 parts of the allyl carbonate, 90 parts of vinyl chloride, 90 parts of ethylene dichloride, and 3 parts of benzoyl peroxide was heated in a sealed tube at 45° C. for 36 hours to give an insoluble copolymer. The copolymer was somewhat thermosetting in nature due to the cross-linking effect of the allyl carbonate.

The thermoplastic characteristics of polystyrene and polymethyl methacrylate may be modified by copolymerization of the monomers with the allyl carbonate.

A solution of 20 parts of the allyl carbonate, 80 parts of styrene, and 3 parts of benzoyl peroxide was heated at 65° C. for 15 hours to give an insoluble and infusible glass-like mass. The Rockwell hardness M was 100.

A solution of 15 parts of the allyl carbonate, 85 parts of methyl methacrylate, and 2.5 parts of benzoyl peroxide was heated at 60° C. for 14 hours to give a thermosetting type glass. The Rockwell hardness M was 85.

Other polymerizable monomers that may be used include vinylidene chloride, (CH$_2$:CHCH$_2$OCO$_2$)$_2$CH$_2$CH$_2$OCH$_2$CH$_2$ having the structural formula

C$_3$H$_5$OCO$_2$CH$_2$CH$_2$OCH$_2$CH$_2$OCO$_2$C$_3$H$_5$ anhydroformaldehyde allyl urethan, butadiene-1,3 and their homologues and analogues. Thus, copolymers with any polymerizable conjugated diene hydrocarbon may be made. Copolymers are also realized when the allyl carbonate is copolymerized with vinyl chloride, vinylidene chloride and monomers of the acrylate grouping, including acrylic acid and the acrylates.

I claim:

1. The carbonate having the structural formula

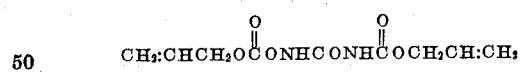

2. A homopolymer of the carbonate having the structural formula

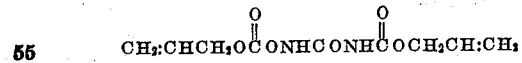

3. A copolymer of 20 parts of the carbonate having the structural formula $$CH_2{:}CHCH_2OCONHCONHCOCH_2CH{:}CH_2$$

and 80 parts of styrene.

4. A copolymer of 10 parts of the carbonate having the structural formula $$CH_2{:}CHCH_2OCONHCONHCOCH_2CH{:}CH_2$$

and 90 parts of vinyl chloride.

5. A copolymer of 15 parts of the carbonate having the structural formula $$CH_2{:}CHCH_2OCONHCONHCOCH_2CH{:}CH_2$$

and 85 parts of methyl methacrylate.

6. A polymer of the carbonate having the structural formula $$CH_2{:}CHCH_2OCONHCONHCOCH_2CH{:}CH_2$$

CLYDE E. GLEIM.

REFERENCES CITED

The following references are of record in the file of this patent:

UNITED STATES PATENTS

| Number | Name | Date |
|---|---|---|
| 2,379,261 | Strain | June 26, 1945 |
| 2,390,551 | Muskat et al. | Dec. 11, 1945 |